United States Patent
Su et al.

(10) Patent No.: US 11,296,797 B2
(45) Date of Patent: Apr. 5, 2022

(54) METHOD AND APPARATUS FOR MONITORING THE CHANGE OF STATE OF POLARIZATION AND A RECEIVER

(71) Applicant: FUJITSU LIMITED, Kawasaki (JP)

(72) Inventors: Xiaofei Su, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 108 days.

(21) Appl. No.: 16/807,771

(22) Filed: Mar. 3, 2020

(65) Prior Publication Data
US 2020/0295843 A1 Sep. 17, 2020

(30) Foreign Application Priority Data
Mar. 12, 2019 (CN) .......................... 201910183830.5

(51) Int. Cl.
*H04J 14/00* (2006.01)
*H04B 10/61* (2013.01)
(Continued)

(52) U.S. Cl.
CPC .......... *H04B 10/6162* (2013.01); *H04J 14/06* (2013.01); *H04L 25/03012* (2013.01)

(58) Field of Classification Search
CPC ................ H04B 10/6162; H04B 10/61; H04B 10/25073; H04B 10/614; H04B 10/6151; H04B 10/616; H04B 10/6971; H04B 7/10; H04B 10/6165; H04B 10/65; H04B 10/2572; H04B 10/2569; H04B 10/532;
(Continued)

(56) References Cited

U.S. PATENT DOCUMENTS

2006/0285855 A1* 12/2006 Sun ....................... H04B 10/508
398/155
2013/0272704 A1* 10/2013 Zamani ................... H04J 14/06
398/65
(Continued)

FOREIGN PATENT DOCUMENTS

CN 103802563 A 5/2014
WO WO 2013/083190 A1 6/2013

OTHER PUBLICATIONS

F. Boitier et al., "Proactive Fiber Damage Detection in Real-time Coherent Receiver", ECOC, 2017, 3 pgs.

*Primary Examiner* — Hibret A Woldekidan
(74) *Attorney, Agent, or Firm* — Staas & Halsey LLP

(57) ABSTRACT

A method and apparatus for monitoring the change of state of polarization and a receiver. The method for monitoring the change of state of polarization includes: extracting a matrix of equalization filter tap coefficients of a receiver; performing an FFT operation of N taps on each path of equalization filter tap coefficients of the matrix to obtain a converted matrix, a sum of each path of equalization filter tap coefficients of the converted matrix being a value of non-zero frequency; and estimating an amount of change of state of polarization by using at least one path of equalization filter tap coefficients of the converted matrix. Thus, as the sum of the tap coefficients is shifted in the frequency domain from the zero frequency to a higher frequency (non-zero frequency), an effect of imperfection of the transmitter on a monitoring result of the change of state of polarization may be avoided.

18 Claims, 3 Drawing Sheets

(51) Int. Cl.
*H04J 14/06* (2006.01)
*H04L 25/03* (2006.01)

(58) Field of Classification Search
CPC ... H04B 10/6166; H04B 10/079; H04J 14/06; H04L 25/03012; H04L 7/027
USPC .................................. 398/65, 149, 202, 208
See application file for complete search history.

(56) References Cited

U.S. PATENT DOCUMENTS

2014/0126916 A1   5/2014   Ota
2014/0341587 A1   11/2014  Nakashima et al.
2016/0241341 A1   8/2016   Endo et al.

\* cited by examiner

FIG. 1

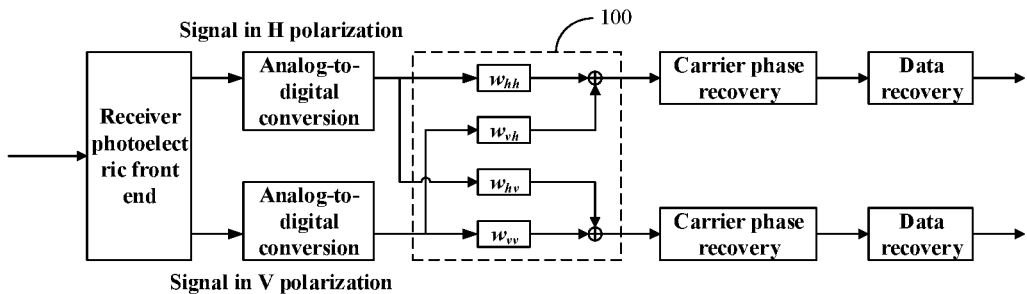

FIG. 2

```
┌─────────────────────────────────────────────────────────────────┐  ─ 201
│ a matrix of equalization filter tap coefficients of a receiver is extracted │
└─────────────────────────────────────────────────────────────────┘
                                    ↓
┌─────────────────────────────────────────────────────────────────┐  ─ 202
│ an FFT operation of N taps is performed on each path of equalization filter │
│ tap coefficients of the matrix to obtain a converted matrix, a sum of each │
│ path of equalization filter tap coefficients of the converted matrix being a │
│                     value of non-zero frequency                  │
└─────────────────────────────────────────────────────────────────┘
                                    ↓
┌─────────────────────────────────────────────────────────────────┐  ─ 203
│ an amount of change of state of polarization is estimated by using at least │
│   one path of equalization filter tap coefficients of the converted matrix │
└─────────────────────────────────────────────────────────────────┘
```

FIG. 3

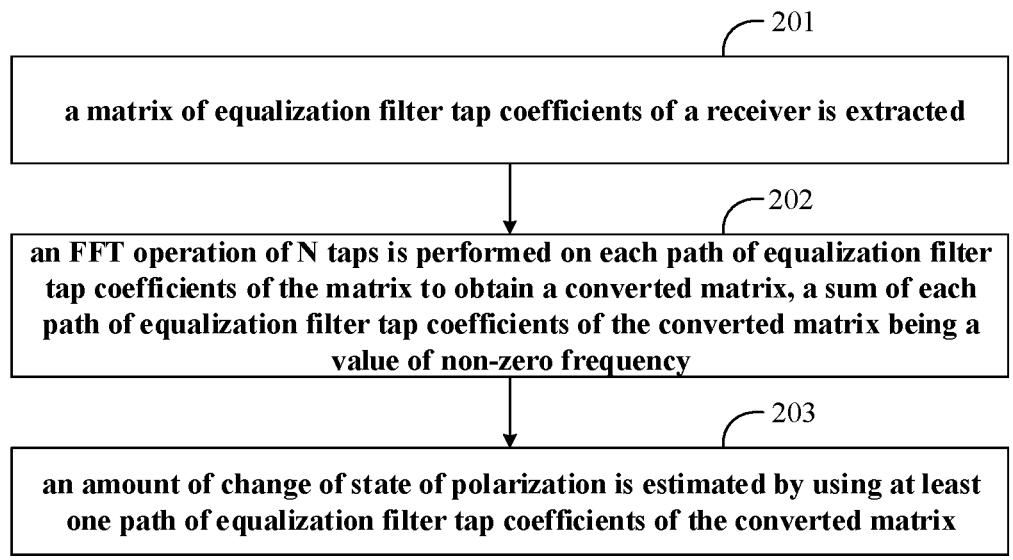

METHOD AND APPARATUS FOR MONITORING THE CHANGE OF STATE OF POLARIZATION AND A RECEIVER

CROSS-REFERENCE TO RELATED APPLICATIONS

This application is based on and hereby claims priority to Chinese Application No. 201910183830.5, filed Mar. 12, 2019, in the State Intellectual Property Office of China, the disclosure of which is incorporated herein by reference.

FIELD

This disclosure relates to the field of optical communications, and in particular to a method and apparatus for monitoring the change of the state of polarization (SOP) and a receiver.

BACKGROUND

Dynamic optical networks occupy an important position in communication transmission networks due to their advantages such as high sensitivity, dynamically controllable routing, and flexible and variable capacities, etc. Optical performance detection is an indispensable technique for dynamic optical networks, which is capable of effectively monitoring changes of various parameters of optical communication system, so as to monitor and control the optical communication system in a real-time manner to make it work in an optimal state.

By monitoring the change of state of polarization, it is possible to effectively discover and distinguish risk events, such as fiber bending, jitter, and hits, etc.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an embodiment of this disclosure, there is provided a method for monitoring the change of state of polarization, including where a matrix of equalization filter tap coefficients of a receiver is extracted; an FFT operation of N taps is performed on each path of equalization filter tap coefficients of the matrix to obtain a converted matrix, a sum of each path of equalization filter tap coefficients of the converted matrix being a value of non-zero frequency; and an amount of change of state of polarization is estimated by using at least one path of equalization filter tap coefficients of the converted matrix.

According to an embodiment of this disclosure, there is provided an apparatus for monitoring the change of state of polarization, wherein the apparatus includes a memory and a processor coupled to the memory.

The processor is configured to extract a matrix of equalization filter tap coefficients of a receiver; perform an FFT operation of N taps on each path of the matrix of equalization filter tap coefficients to obtain a converted matrix, a sum of each path of equalization filter tap coefficients of the converted matrix being a value of non-zero frequency; and estimate an amount of change of state of polarization by using at least one path of equalization filter tap coefficients of the converted matrix.

According to an embodiment of this disclosure, there is provided a receiver, including the apparatus as described in the second aspect.

According to an embodiment of this disclosure, there is provided a computer readable program, which, when executed in a receiver, will cause the receiver to carry out the method as described herein.

According to an embodiment of this disclosure, there is provided a medium, including a computer readable program, which will cause a receiver to carry out the method as described herein.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the exemplary embodiments of this disclosure, and are used for setting forth the principles of this disclosure together with the description. It is clear and understood that the accompanying drawings in the following description are some embodiments of this disclosure, and for those of ordinary skills in the art, other accompanying drawings may be obtained according to these accompanying drawings without making an inventive effort. In the drawings:

FIG. 1 is a schematic diagram of a typical polarization multiplexing digital coherent receiver;

FIG. 2 is a schematic diagram of the method for monitoring the change of the state of polarization according to an embodiment;

FIG. 3 is a schematic diagram of a process for estimating an amount of the change of the state of polarization;

DETAILED DESCRIPTION

Figure 4:
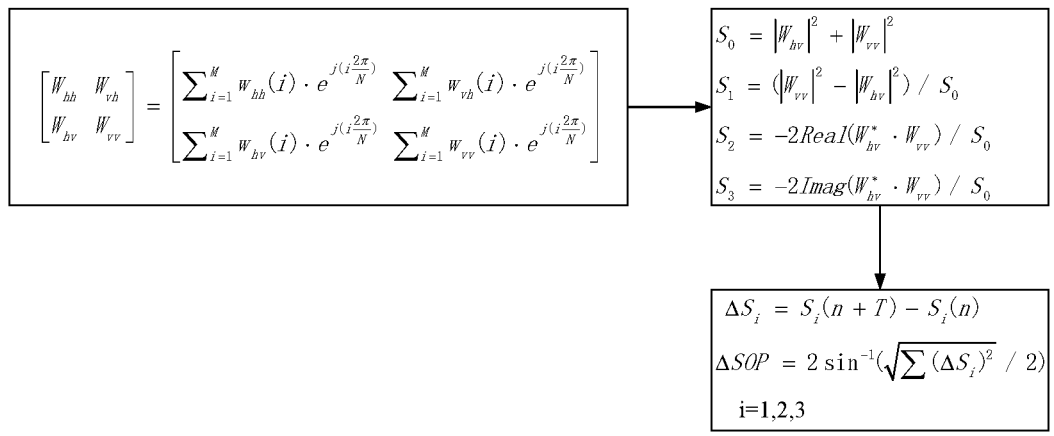
FIG. 4 is another schematic diagram of a process for estimating an amount of the change of the state of polarization.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

As to monitoring the change of state of polarization, there are related solutions at present, such as calculating a rotation speed of state of polarization based on equalization coefficients of a 2×2 CMA (constant modulus algorithm) filter. However, it was found by the inventors that as such a method uses equalization filter coefficients at 0 Hz in the frequency domain, it will be subjected to imperfection of a transmitter, such as a transmitter direct current, phase imbalance, and amplitude imbalance, resulting in that there exist errors in an amount of monitored change of state of polarization.

In order to solve the above problem or other similar problems, embodiments of this disclosure provide a method and apparatus for monitoring the change of state of polarization and a receiver.

An exemplary advantage of the embodiments of this disclosure exists in that by performing an FFT operation of N taps on each path of equalization filter tap coefficients, the sum of the tap coefficients is shifted in the frequency domain from the zero frequency to a higher frequency (non-zero frequency), and an effect of imperfection of the transmitter on a monitoring result of the change of state of polarization may be avoided.

FIG. 1 is a schematic diagram of a typical polarization multiplexing digital coherent receiver. As shown in FIG. 1, $w_{hh}$, $w_{vh}$, $w_{hv}$ and $w_{vv}$ are tap coefficients of a four-path linear equalization filter 100. In this embodiment, a finite impulse response (FIR) linear filter of a butterfly structure may be used as the equalization filter 100, and a particular equalization algorithm is not limited in this embodiment. For example, a constant modulus algorithm (CMA), least square error estimation, minimum mean square error (MMSE) estimation, best linear unbiased estimation (BLUE), or other equalization algorithms, may be used.

In this embodiment, as shown in FIG. 1, the structure of the equalization filter 100 is a 2×2 multiple input multiple output (MIMO) structure, that is, $$\begin{bmatrix} w_{hh} & w_{vh} \\ w_{hv} & w_{vv} \end{bmatrix}.$$

However, the structure of the equalization filter is not limited in this embodiment, and a 2×4 MIMO structure, $$\begin{bmatrix} w_{hh} & j*w_{hh} & w_{vh} & j*w_{vh} \\ w_{hv} & j*w_{hv} & w_{vv} & j*w_{vv} \end{bmatrix},$$

may also be used, or a 4×4 MIMO structure, $$\begin{bmatrix} real(w_{hh}) & -imag(w_{hh}) & real(w_{vh}) & -imag(w_{vh}) \\ imag(w_{hh}) & real(w_{hh}) & imag(w_{vh}) & real(w_{vh}) \\ real(w_{hv}) & -imag(w_{hv}) & real(w_{vv}) & -imag(w_{vv}) \\ imag(w_{hv}) & real(w_{hv}) & imag(w_{vv}) & real(w_{vv}) \end{bmatrix},$$

may also be used, as long as they are converted into the 2×2 MIMO structure, $$\begin{bmatrix} w_{hh} & w_{vh} \\ w_{hv} & w_{vv} \end{bmatrix}.$$

Various implementations of the embodiments of this disclosure shall be described below with reference to the accompanying drawings.

Embodiment 1

This embodiment provides a method for monitoring the change of state of polarization.

FIG. 2 is a schematic diagram of the method for monitoring the change of state of polarization of this embodiment. As shown in FIG. 2, the method includes:

operation 201: a matrix of equalization filter tap coefficients of a receiver is extracted;

operation 202: an FFT operation of N taps is performed on each path of equalization filter tap coefficients of the matrix to obtain a converted matrix, a sum of each path of equalization filter tap coefficients of the converted matrix being a value of non-zero frequency; and operation 203: an amount of change of state of polarization is estimated by using at least one path of equalization filter tap coefficients of the converted matrix.

In the receiver, as shown in FIG. 1, a Jones matrix of the equalization filter tap coefficients in the time domain is $$\begin{bmatrix} w_{hh} & w_{vh} \\ w_{hv} & w_{vv} \end{bmatrix},$$

In the related art, each path of tap coefficients are added up in the time domain, for example, the number M of taps is 17, and an addition result is $$\begin{bmatrix} W_{hh} & W_{vh} \\ W_{hv} & W_{vv} \end{bmatrix} = \begin{bmatrix} \sum_{i=1}^{17} w_{hh}(i) & \sum_{i=1}^{17} w_{vh}(i) \\ \sum_{i=1}^{17} w_{hv}(i) & \sum_{i=1}^{17} w_{vv}(i) \end{bmatrix}.$$

The sum of the tap coefficients of this method is located at 0 Hz (zero frequency) in the frequency domain, and imperfection of a transmitter also occurs at 0 GHz, thus, an estimated value of the change of state of polarization will also be affected by the imperfection of the transmitter.

In this embodiment, by performing an FFT operation of N taps on each path of equalization filter tap coefficients, the sum of the tap coefficients is shifted in the frequency domain from the zero frequency to a higher frequency (non-zero frequency), and an effect of imperfection of the transmitter on a result of monitoring the change of state of polarization may be avoided.

For example, it is supposed that a sampling rate is 84G sampling/second, N=8, and a frequency interval is 84e9/8=10.5 GHz. Thus, the sum of the tap coefficients is shifted from 0 Hz to 10.5 GHz, thereby avoiding the effect of imperfection of the transmitter at 0 Hz on an estimated amount of change of state of polarization.

In operation 201 of this embodiment, the above equalization filter tap coefficient matrix is a Jones matrix in the time domain, such as $$\begin{bmatrix} w_{hh} & w_{vh} \\ w_{hv} & w_{vv} \end{bmatrix},$$

and a manner of acquiring the matrix is not limited in this embodiment.

In operation 202 of this embodiment, it is assumed that the number of the taps of the equalization filter is M, and the FFT operation of N taps is performed on each path of equalization filter tap coefficients in the equalization filter tap coefficient matrix obtained in operation 201 to obtain the converted matrix:

$$\begin{bmatrix} W_{hh} & W_{vh} \\ W_{hv} & W_{vv} \end{bmatrix} = \begin{bmatrix} \sum_{i=1}^{M} w_{hh}(i) \cdot e^{j(i\frac{2\pi}{N})} & \sum_{i=1}^{M} w_{vh}(i) \cdot e^{j(i\frac{2\pi}{N})} \\ \sum_{i=1}^{M} w_{hv}(i) \cdot e^{j(i\frac{2\pi}{N})} & \sum_{i=1}^{M} w_{vv}(i) \cdot e^{j(i\frac{2\pi}{N})} \end{bmatrix}.$$

In this embodiment, the sum of each path of equalization filter tap coefficients of the converted matrix (a result of addition in the time domain) is a value of non-zero frequency, thereby avoiding the effect of imperfection of the transmitter at 0 Hz on an estimated amount of change of state of polarization.

For example, assuming that the number M of the taps of the equalization filter is 17 and the number N of taps on which the FFT operation is performed is 8, the result of the addition (i.e. the converted matrix) is:

$$\begin{bmatrix} W_{hh} & W_{vh} \\ W_{hv} & W_{vv} \end{bmatrix} = \begin{bmatrix} \sum_{i=1}^{17} w_{hh}(i) \cdot e^{j(i\frac{2\pi}{8})} & \sum_{i=1}^{17} w_{vh}(i) \cdot e^{j(i\frac{2\pi}{8})} \\ \sum_{i=1}^{17} w_{hv}(i) \cdot e^{j(i\frac{2\pi}{8})} & \sum_{i=1}^{17} w_{vv}(i) \cdot e^{j(i\frac{2\pi}{8})} \end{bmatrix}.$$

In this embodiment, the sum of each path of equalization filter tap coefficients of the converted matrix may be a value of a frequency point most close to zero frequency, such as a value on the left or right near 0 Hz; however, this embodiment is not limited thereto, and the sum of each path of equalization filter tap coefficients of the converted matrix may also be values of two frequency points closest to the zero frequency. In addition, in order to improve a signal-to-noise ratio of monitoring the change of state of polarization, a frequency of the sum of each path of equalization filter tap coefficients of the converted matrix needs to be within a signal bandwidth range.

In this embodiment, the number N of taps on which the FFT operation is performed (also referred to as the number of FFT taps) may be an integer power of 2, thereby facilitating fast calculation and lowering complexity. For example, the number N of FFT taps may be 8. Hence, no matter a value of i, exp(ji2π/8) is one in $\sqrt{0.5}(\pm 1 \pm j)$. In this way, multiplication operations of exp(ji2π/8) with other numbers may be implemented by logical operations and addition and subtraction, thereby greatly lowering computational complexity.

In operation 203 of this embodiment, at least one path of equalization filter tap coefficients of the converted matrix may be used to estimate the amount of change of state of polarization.

In one example, the at least one path of equalization filter tap coefficients of the converted matrix may be converted from the Jones matrix $$\begin{bmatrix} w_{hh} & w_{vh} \\ w_{hv} & w_{vv} \end{bmatrix}$$

to the Stokes vector (S0, S1, S2 and S3) for representation, an amount ($\Delta S_i$) of change of Stokes vectors of the equalization filter tap coefficient within a time interval T is calculated, and an amount ($\Delta SOP$) of change of state of polarization within the time interval T is calculated according to the amount of change of Stokes vectors.

FIG. 3 shows an example of calculating the amount of change of state of polarization within the time interval T by using the amount of change of Stokes vectors in the H polarization, and FIG. 4 shows an example of calculating the amount of change of state of polarization within the time interval T by using the amount of change of Stokes vectors in the V polarization.

In these examples, assuming M=17 and N=8, sums of four paths of equalization filter tap coefficients of the converted matrix are:

$$W_{hh} = \sum_{i=1}^{17} w_{hh}(i) \cdot e^{j(i\frac{2\pi}{8})},$$

-continued $$W_{vh} = \sum_{i=1}^{17} w_{vh}(i) \cdot e^{j(i\frac{2\pi}{8})},$$

$$W_{hv} = \sum_{i=1}^{17} w_{hv}(i) \cdot e^{j(i\frac{2\pi}{8})}, \text{ and}$$

$$W_{vv} = \sum_{i=1}^{17} w_{vv}(i) \cdot e^{j(i\frac{2\pi}{8})}.$$

In these examples, the tap coefficients of the H polarization may be converted from the Jones matrix to the Stokes vector for representation, as shown in FIG. 3, and the converted Stokes vectors are respectively expressed as:

$$S_0 = |W_{hh}|^2 + |W_{vh}|^2,$$

$$S_1 = (|W_{hh}|^2 - |W_{vh}|^2)/S_0,$$

$$S_2 = -2\text{Real}(W^*_{vh} \cdot W_{hh})/S_0,$$

$$S_3 = -2\text{Imag}(W^*_{vh} \cdot W_{hh})/S_0.$$

By calculating the amount ($\Delta S_i = S_i(n+T) - S_i(n)$) of change of Stokes vectors of the tap coefficients of the H polarization within the interval T, the amount ($\Delta SOP = 2 \sin^{-1}(\sqrt{\Sigma(\Delta S_i)^2}/2)$) of change of state of polarization within the interval T is obtained; where i=1, 2, 3.

Or, in these examples, the tap coefficient of the V polarization may also be converted from the Jones matrix to the Stokes vector for representation, as shown in FIG. 4, and the converted Stokes vectors are respectively expressed as:

$$S_0 = |W_{hv}|^2 + |W_{vv}|^2,$$

$$S_1 = (|W_{vv}|^2 - |W_{hv}|^2)/S_0,$$

$$S_2 = -2\text{Real}(W^*_{hv} \cdot W_{vv})/S_0,$$

$$S_3 = -2\text{Imag}(W^*_{hv} \cdot W_{vv})/S_0.$$

By calculating the amount ($\Delta S_i = S_i(n+T) - S_i(n)$) of change of Stokes vectors of the tap coefficients of the V polarization within the interval T, the amount ($\Delta SOP = 2 \sin^{-1}(\sqrt{\Sigma(\Delta S_i)^2}/2)$) of change of state of polarization within the interval T is obtained; where i=1, 2, 3.

In these examples, description is given by taking calculating the amounts of change of state of polarization by using only the Stokes vectors of the H polarization or the V polarization as examples. However, this embodiment is not limited thereto, and the amounts of change of state of polarization may also be calculated by using both the Stokes vectors of the H polarization and the Stokes vectors of the V polarization. For example, the amounts of change of state of polarization obtained through calculation by using the Stokes vectors of the state of polarization may be averaged to obtain the result of the change of state of polarization; however, this embodiment is not limited thereto.

In another example, an amount (DW) of change of the converted matrix within the time interval T may be calculated, normalization processing is perform on the amount (DW) of change to obtain a normalized amount (DW') of change, and the amount ($\Delta SOP$) of change of state of polarization within the time interval T is calculated by using at least one value in the normalized amount (DW') of change.

Figure 5:
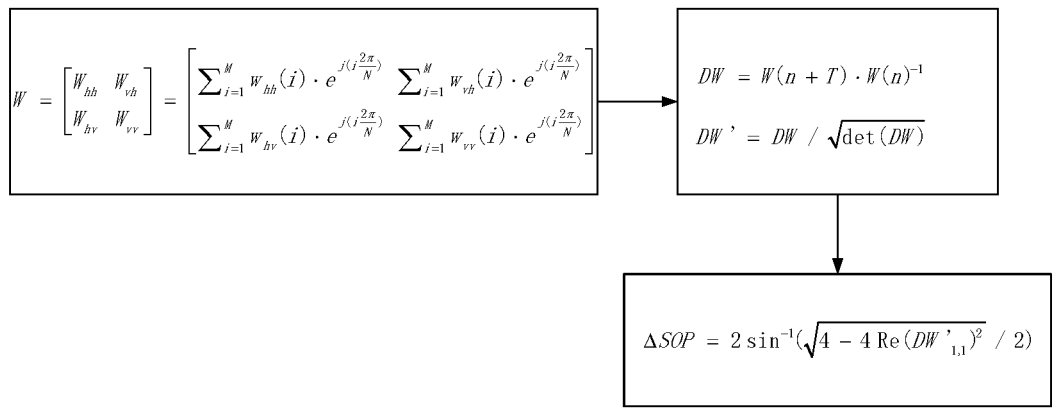
FIG. 5 is a further schematic diagram of a process for estimating an amount of the change of the state of polarization.

FIG. 5 shows an example of calculating the amount ($\Delta SOP$) of change of state of polarization within the time interval T by using a value $DW'_{1,1}$ in the normalized amount (DW') of change.

In this example, assuming M=17 and N=8, sums of four paths of equalization filter tap coefficients of the converted matrix are:

$$W_{hh} = \sum_{i=1}^{17} w_{hh}(i) \cdot e^{j(i\frac{2\pi}{8})},$$

$$W_{vh} = \sum_{i=1}^{17} w_{vh}(i) \cdot e^{j(i\frac{2\pi}{8})},$$

$$W_{hv} = \sum_{i=1}^{17} w_{hv}(i) \cdot e^{j(i\frac{2\pi}{8})}, \text{ and}$$

$$W_{vv} = \sum_{i=1}^{17} w_{vv}(i) \cdot e^{j(i\frac{2\pi}{8})}.$$

In this example, the amount DW of change of the converted matrix W within the time interval T may be calculated, $$W = \begin{bmatrix} W_{hh} & W_{vh} \\ W_{hv} & W_{vv} \end{bmatrix} = \begin{bmatrix} \sum_{i=1}^{M} w_{hh}(i) \cdot e^{j(i\frac{2\pi}{N})} & \sum_{i=1}^{M} w_{vh}(i) \cdot e^{j(i\frac{2\pi}{N})} \\ \sum_{i=1}^{M} w_{hv}(i) \cdot e^{j(i\frac{2\pi}{N})} & \sum_{i=1}^{M} w_{vv}(i) \cdot e^{j(i\frac{2\pi}{N})} \end{bmatrix},$$

$$DW = W(n+T) \cdot W(n)^{-1},$$

then normalization processing is performed on the amount DW of change to obtain the normalized amount DW' of change, $$DW' = DW/\sqrt{\det(DW)};$$

where, DW and DW' are both matrices with two rows and two columns, and det ( ) is a determinant operation, for example, $$W = \begin{bmatrix} w_{hh} & w_{vh} \\ w_{hv} & w_{vv} \end{bmatrix}, \det(W) = |W_{hh} \cdot W_{vv} - W_{hv} \cdot W_{vh}|.$$

Hence, at least one value in DW', such as a value $DW'_{1,1}$ of the first row and the first column in DW' may be used to calculate the amount ($\Delta SOP = 2 \sin^{-1}(\sqrt{4 - 4\text{Re}(DW'_{1,1})^2}/2)$) of change of state of polarization within the time interval T.

In this example, the value $DW'_{1,1}$ of the first row and the first column in the normalized amount (DW') of change may be used to calculate the amount of change of state of polarization within the time interval T. However, this embodiment is not limited thereto, and other one or more values in the normalized amount (DW') of change may also be used to calculate the amount of change of state of polarization within the time interval T, which shall not be described herein any further.

In this embodiment, by performing an FFT operation of N taps on each path of equalization filter tap coefficients, the sum of the tap coefficients is shifted in the frequency domain from the zero frequency to a higher frequency (non-zero frequency), and an effect of imperfection of the transmitter on a result of monitoring the change of state of polarization may be avoided.

Embodiment 2

This embodiment provides an apparatus for monitoring the change of state of polarization. As principles of the apparatus for solving problems are similar to that of the method in Embodiment 1, reference may be made to the implementation of the method in Embodiment 1 for implementation of the apparatus, with identical contents being not going to be described herein any further.

Figure 6:
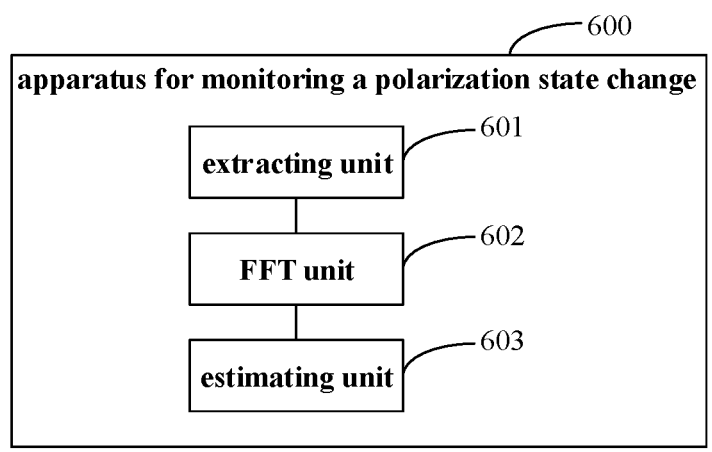
FIG. 6 is a schematic diagram of the apparatus for monitoring the change of the state of polarization according to an embodiment.

FIG. 6 is a schematic diagram of the apparatus for monitoring the change of state of polarization of this embodiment. As shown in FIG. 6, the apparatus 600 includes an extracting unit 601, an FFT unit 602 and an estimating unit 603.

The extracting unit 601 is configured to extract a matrix of equalization filter tap coefficients of a receiver, the FFT unit 602 is configured to perform an FFT operation of N taps on each path of equalization filter tap coefficients of the matrix of equalization filter tap coefficients to obtain a converted matrix, a sum of each path of equalization filter tap coefficients of the converted matrix being a value of non-zero frequency, and the estimating unit 603 is configured to estimate an amount of change of state of polarization by using at least one path of equalization filter tap coefficients of the converted matrix.

In this embodiment, the sum of each path of equalization filter tap coefficients of the converted matrix is a value of a frequency point most close to zero frequency, and a frequency of the sum of each path of equalization filter tap coefficients of the converted matrix is within a signal bandwidth range.

In this embodiment, the number N of the taps performing the FFT operation is an integer power of 2, such as 8.

Figure 7:
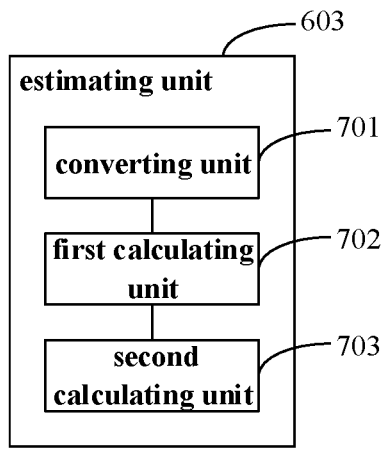
FIG. 7 is a schematic diagram of the estimating unit of the apparatus for monitoring the change of the state of polarization according to an embodiment.

FIG. 7 is a schematic diagram of one implementation of the estimating unit 603 of the apparatus 600 for monitoring the change of state of polarization of this embodiment. As shown in FIG. 7, the estimating unit 603 may include a converting unit 701, a first calculating unit 702 and a second calculating unit 703.

The converting unit 701 is configured to convert an equalization filter tap coefficient of at least one state of polarization of the converted matrix from a Jones matrix into a Stokes Vector for representation, the first calculating unit 702 is configured to calculate an amount of change of a Stokes vector of the equalization filter tap coefficient within a time interval T, and the second calculating unit 703 is configured to calculate an amount of change of state of polarization within the time interval T according to the amount of change of a Stokes vector.

In this implementation, the at least one state of polarization may be the H polarization, or may be the V polarization, or may be the H polarization and the V polarization. A particular implementation thereof is as described in Embodiment 1, which shall not be described herein any further.

Figure 8:
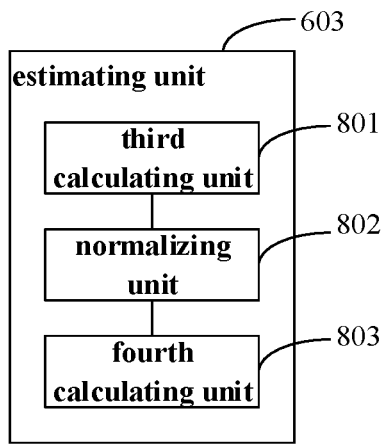
FIG. 8 is another schematic diagram of the estimating unit of the apparatus for monitoring the change of the state of polarization according to an embodiment.

FIG. 8 is a schematic diagram of another implementation of the estimating unit 603 of the apparatus 600 for monitoring the change of state of polarization of this embodiment. As shown in FIG. 8, the estimating unit 603 may include a third calculating unit 801, a normalizing unit 802 and a fourth calculating unit 803.

The third calculating unit 801 is configured to calculate an amount (DW) of change of the converted matrix within the time interval T, the normalizing unit 802 is configured to perform normalization processing on the amount of change to obtain a normalized amount (DW') of change, and the fourth calculating unit 803 is configured to calculate the amount of change of state of polarization within the time interval T by using at least one value in the normalized amount (DW') of change.

In this implementation, the fourth calculating unit 803 may calculate the amount of change of state of polarization within the time interval T by using a value in a first row and a first column in the normalized amount (DW') of change. A particular implementation thereof is as described in Embodiment 1, which shall not be described herein any further.

In this embodiment, the apparatus 600 for monitoring the change of state of polarization may be implemented by a processor and a memory.

For example, in one implementation, the functions of the apparatus 600 for monitoring the change of state of polarization may be integrated into a processor, and the functions of the apparatus 600 for monitoring the change of state of polarization may be carried out by the processor. The functions of the apparatus 600 for monitoring the change of state of polarization are incorporated herein, and shall not be described herein any further.

For example, in another implementation, the apparatus 600 for monitoring the change of state of polarization and the processor may be configured separately. For example, the apparatus 600 for monitoring the change of state of polarization may be configured as a chip connected to the processor, and the functions of the apparatus 600 for monitoring the change of state of polarization are carried out under control of the processor.

In this embodiment, the memory may be, for example, one or more of a buffer memory, a flash memory, a hard drive, a mobile medium, a volatile memory, a nonvolatile memory, or other suitable devices, which may store various data, and furthermore, store programs for information processing.

In this embodiment, the processor is sometimes referred to as a controller or control, which may include a microprocessor or other processor devices and/or logic devices, and the processor receives input and controls operations of every component of a receiver. And the processor may execute the programs stored in the memory to achieve information storage or processing, etc.

In this embodiment, by performing an FFT operation of N taps on each path of equalization filter tap coefficients of the receiver, the sum of the tap coefficients is shifted in the frequency domain from the zero frequency to a higher frequency (non-zero frequency), and an effect of imperfection of the transmitter on a result of monitoring the change of state of polarization may be avoided.

Embodiment 3

Figure 9:
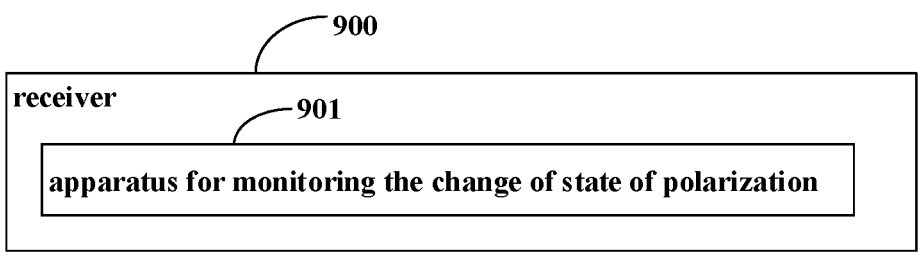
FIG. 9 is a schematic diagram of the receiver according to an embodiment.

This embodiment provides a receiver. FIG. 9 is a schematic diagram of a structure of the receiver. As shown in FIG. 9, the receiver 900 includes an apparatus 901 for monitoring the change of state of polarization, the apparatus 901 having the constitution and functions of the apparatus 600 for monitoring the change of state of polarization described in Embodiment 2 and being used to carry out the operations (steps) of the method for monitoring the change of state of polarization described in Embodiment 1, and the contents of Embodiment 1 and Embodiment 2 being incorporated herein, which shall not be described herein any further.

In this embodiment, the receiver may further include other modules, as shown in FIG. 1, and reference may be made to the related art for constitution and functions thereof, which shall not be described herein any further.

In this embodiment, by performing an FFT operation of N taps on each path of equalization filter tap coefficients of the receiver, the sum of the tap coefficients is shifted in the frequency domain from the zero frequency to a higher frequency (non-zero frequency), and an effect of imperfection of the transmitter on a result of monitoring the change of state of polarization may be avoided.

Embodiment 4

This embodiment provides a communication system, including a transmitter, a receiver and an apparatus for monitoring the change of state of polarization. The apparatus for monitoring the change of state of polarization is connected to or configured in the receiver, and may be the apparatus 600 for monitoring the change of state of polarization in Embodiment 2. As the constitution and functions of the apparatus 600 for monitoring the change of state of polarization have been described in detail in Embodiment 2, its contents are incorporated herein, and shall not be described herein any further. In this embodiment, reference may be made to the related art for conventional functions of the transmitter and receiver, which shall not be described herein any further.

An embodiment of this disclosure provides a computer readable program, which, when executed in an apparatus for monitoring the change of state of polarization, will cause the apparatus for monitoring the change of state of polarization to carry out the method described in Embodiment 1.

An embodiment of this disclosure provides a medium, including a computer readable program, which will cause an apparatus for monitoring the change of state of polarization to carry out the method described in Embodiment 1.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or operations (steps) as described above. The operations of this disclosure may be executed by a hardware processor communicatively coupled to a memory. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 6 (e.g. the extracting unit, the FFT unit, and the estimating unit, etc.) may either correspond to software modules of procedures of a computer program, or correspond to hardware modules. Such software modules may respectively correspond to the operations (steps) shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. An apparatus for monitoring the change of state of polarization, comprising:
   a memory;
   a processor coupled to the memory and configured to:
      extract a matrix of equalization filter tap coefficients of a receiver, the matrix of equalization filter tap coefficients being a Jones matrix in a time domain;
      perform an FFT operation of N taps on each path of equalization filter tap coefficients of the matrix to obtain a converted matrix, a sum of each path of equalization filter tap coefficients of the converted matrix being a value of non-zero frequency; and
      estimate an amount of change of state of polarization by using at least one path of the equalization filter tap coefficients of the converted matrix.

2. The apparatus according to claim 1, wherein the sum of each path of equalization filter tap coefficients of the converted matrix is a value of a frequency point most close to zero frequency.

3. The apparatus according to claim 1, wherein a frequency of the sum of each path of equalization filter tap coefficients of the converted matrix is within a signal bandwidth range.

4. The apparatus according to claim 1, wherein a number N of the taps performing the FFT operation is an integer power of 2.

5. The apparatus according to claim 4, wherein N is 8.

6. The apparatus according to claim 1, wherein the processor is further configured to:
   convert an equalization filter tap coefficient of at least one state of polarization of the converted matrix from a Jones matrix into a Stokes Vector for representation;

calculate an amount of change of a Stokes vector of the equalization filter tap coefficient within a time interval T; and calculate an amount of change of state of polarization within the time interval T according to the amount of change of a Stokes vector.

7. The apparatus according to claim 6, wherein the at least one state of polarization is the H polarization, or the V polarization, or the H polarization and the V polarization.

8. The apparatus according to claim 1, wherein the processor is further configured to:

calculate an amount of change of the converted matrix within a time interval T;

perform normalization processing on the amount of change to obtain a normalized amount of change; and calculate the amount of change of state of polarization within the time interval T by using at least one value in the normalized amount of change.

9. The apparatus according to claim 8, wherein the processor calculates the amount of change of state of polarization within the time interval T by using a value in a first row and a first column in the normalized amount of change.

10. A method for monitoring the change of state of polarization, comprising:

extracting a matrix of equalization filter tap coefficients of a receiver, the matrix of equalization filter tap coefficients being a Jones matrix in a time domain;

performing an FFT operation of N taps on each path of equalization filter tap coefficients of the matrix to obtain a converted matrix, a sum of each path of equalization filter tap coefficients of the converted matrix being a value of non-zero frequency; and estimating an amount of change of state of polarization by using at least one path of the equalization filter tap coefficients of the converted matrix.

11. The method according to claim 10, wherein the sum of each path of equalization filter tap coefficients of the converted matrix is a value of a frequency point most close to zero frequency.

12. The method according to claim 10, wherein a frequency of the sum of each path of equalization filter tap coefficients of the converted matrix is within a signal bandwidth range.

13. The method according to claim 10, wherein a number N of the taps performing the FFT operation is an integer power of 2.

14. The method according to claim 13, wherein N is 8.

15. The method according to claim 10, wherein the estimating of the amount of change of state of polarization by using the at least one path of equalization filter tap coefficients of the converted matrix comprises:

converting an equalization filter tap coefficient of at least one state of polarization of the converted matrix from a Jones matrix into a Stokes Vector for representation;

calculating an amount of change of a Stokes vector of the equalization filter tap coefficient within a time interval T; and calculating an amount of change of state of polarization within the time interval T according to the amount of change of a Stokes vector.

16. The method according to claim 15, wherein the at least one state of polarization is the H polarization, or the V polarization, or the H polarization and the V polarization.

17. The method according to claim 10, wherein the estimating of the amount of change of state of polarization by using the at least one path of equalization filter tap coefficients of the converted matrix, comprises:

calculating an amount of change of the converted matrix within a time interval T;

performing normalization processing on the amount of change to obtain a normalized amount of change; and calculating the amount of change of state of polarization within the time interval T by using at least one value in the normalized amount of change.

18. The method according to claim 17, wherein the amount of change of state of polarization within the time interval T is calculated by using a value in a first row and a first column in the normalized amount of change.

\* \* \* \* \*